(12) United States Patent
Sanz

(10) Patent No.: US 10,436,252 B2
(45) Date of Patent: *Oct. 8, 2019

(54) BUILDING BLOCK FOR A MECHANICAL CONSTRUCTION

(71) Applicant: AKTIEBOLAGET SKF, Göteborg (SE)

(72) Inventor: Alejandro Sanz, Nieuwegein (NL)

(73) Assignee: Aktiebolaget SKF, Göteborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/106,664

(22) PCT Filed: Dec. 18, 2014

(86) PCT No.: PCT/EP2014/078360
§ 371 (c)(1),
(2) Date: Jun. 20, 2016

(87) PCT Pub. No.: WO2015/091726
PCT Pub. Date: Jun. 25, 2015

(65) Prior Publication Data
US 2017/0036395 A1    Feb. 9, 2017

(30) Foreign Application Priority Data

Dec. 18, 2013 (GB) .................................. 1322415.9

(51) Int. Cl.
*F16C 33/62* (2006.01)
*B29C 70/70* (2006.01)
(Continued)

(52) U.S. Cl.
CPC .............. *F16C 33/62* (2013.01); *B29C 64/00* (2017.08); *B29C 64/112* (2017.08); *B29C 70/70* (2013.01);
(Continued)

(58) Field of Classification Search
CPC ................ F16C 33/34; F16C 33/58–64; F16C 2220/24; C04B 41/88; C04B 41/51–5177; C04B 41/5194
See application file for complete search history.

(56) References Cited

U.S. PATENT DOCUMENTS 4,960,643 A * 10/1990 Lemelson ............ B23D 61/185
384/907.1
5,173,220 A    12/1992 Reiff et al.
(Continued)

FOREIGN PATENT DOCUMENTS

CN    101911084 A    12/2010
CN    102862333 A    1/2013
(Continued)

OTHER PUBLICATIONS

Machine Translation of JP 2007/046496 A, obtained from Industrial Property Digital Library of the JPO on May 15, 2017.*
NPL on Patent claim writing from Practising Law Institute.*

*Primary Examiner* — Z. Jim Yang
(74) *Attorney, Agent, or Firm* — Bryan Peckjian; SKF USA Inc. Patent Dept.

(57) ABSTRACT

The invention provides a building block for a mechanical construction. The invention further provides a bearing, an actuator system, a housing, a hub, a mechanical connector and a gear box. The building block includes a first printed material being printed via an additive manufacturing process. The first printed material provides a framework of a second material different from the first printed material and at least partially embedded in the first printed material. The framework of the second material may be included in a hollow structure. Alternatively, at least a part of the framework of the second material may constitute at least a part of the inner wall of the hollow structure. The framework of the second material may be pre-fabricated or may also be (Continued)

generated via the additive manufacturing process. A benefit of this building block is that it allows an increase of strength while limiting the overall weight.

14 Claims, 6 Drawing Sheets

(51) Int. Cl.
- *B33Y 80/00* (2015.01)
- *B29C 64/00* (2017.01)
- *B29C 64/112* (2017.01)
- *B29L 31/04* (2006.01)
- *B29L 31/00* (2006.01)
- *F16C 33/32* (2006.01)
- *F16C 33/34* (2006.01)
- *F16H 55/06* (2006.01)
- *F16H 55/17* (2006.01)

(52) U.S. Cl.
CPC ........... *B33Y 80/00* (2014.12); *B29L 2031/04* (2013.01); *B29L 2031/748* (2013.01); *F16C 33/32* (2013.01); *F16C 33/34* (2013.01); *F16C 2220/06* (2013.01); *F16C 2220/24* (2013.01); *F16H 55/06* (2013.01); *F16H 55/17* (2013.01)

(56) References Cited

U.S. PATENT DOCUMENTS

| | | | | |
|---|---|---|---|---|
| 5,516,213 A * | 5/1996 | Moriyama | ............... | F16C 33/24 384/292 |
| 5,588,477 A * | 12/1996 | Sokol | ............... | B22D 19/14 164/34 |
| 6,179,933 B1 * | 1/2001 | Dodd | ............... | C23C 8/38 148/222 |
| 6,379,051 B1 * | 4/2002 | Horn | ............... | B66F 9/08 384/537 |
| 6,861,613 B1 | 3/2005 | Meiners et al. | | |
| 8,486,870 B1 * | 7/2013 | Malshe | ............... | C10M 171/00 427/307 |
| 2003/0079640 A1 * | 5/2003 | Beatson | ............... | F16O 29/04 104/106 |
| 2003/0133821 A1 * | 7/2003 | Moxson | ............... | B22F 3/26 419/8 |
| 2004/0146736 A1 * | 7/2004 | Ivanov | ............... | C22C 1/0491 428/609 |
| 2008/0101735 A1 * | 5/2008 | Van De Sanden | ...... | F16C 33/60 384/7 |
| 2008/0144981 A1 * | 6/2008 | Shirai | ............... | F16C 29/005 384/44 |
| 2009/0220181 A1 * | 9/2009 | Yamada | ............... | F16C 33/3812 384/513 |
| 2010/0009133 A1 | 1/2010 | Chait | | |
| 2010/0047612 A1 * | 2/2010 | Kugo | ............... | B22F 7/08 428/613 |
| 2012/0261227 A1 * | 10/2012 | Arnault | ............... | F16D 23/14 192/82 R |
| 2013/0216174 A1 * | 8/2013 | Braun | ............... | B29C 67/0051 384/572 |
| 2013/0309522 A1 * | 11/2013 | Ito | ............... | C04B 41/00 428/596 |
| 2014/0044385 A1 * | 2/2014 | Andelkovski | ............... | B32B 15/08 384/276 |
| 2014/0140647 A1 * | 5/2014 | Saxton | ............... | F16C 33/1095 384/276 |
| 2015/0036959 A1 * | 2/2015 | Strian | ............... | F16C 19/04 384/513 |
| 2015/0044084 A1 * | 2/2015 | Hofmann | ............... | B32B 15/01 419/7 |
| 2015/0139582 A1 * | 5/2015 | Sears | ............... | F16C 33/64 384/548 |
| 2015/0308508 A1 * | 10/2015 | Hartling | ............... | F16C 33/7856 384/484 |
| 2016/0076587 A1 * | 3/2016 | Chitose | ............... | F16C 33/1095 384/299 |

FOREIGN PATENT DOCUMENTS

| | | | | |
|---|---|---|---|---|
| JP | 2007046496 A | * | 2/2007 | |
| JP | WO 2012111530 A1 | * | 8/2012 | ............ C04B 41/00 |
| WO | WO-2013112217 A2 | * | 8/2013 | ............ B32B 15/01 |
| WO | WO-2014166486 A1 | * | 10/2014 | ............ F16C 19/527 |

* cited by examiner

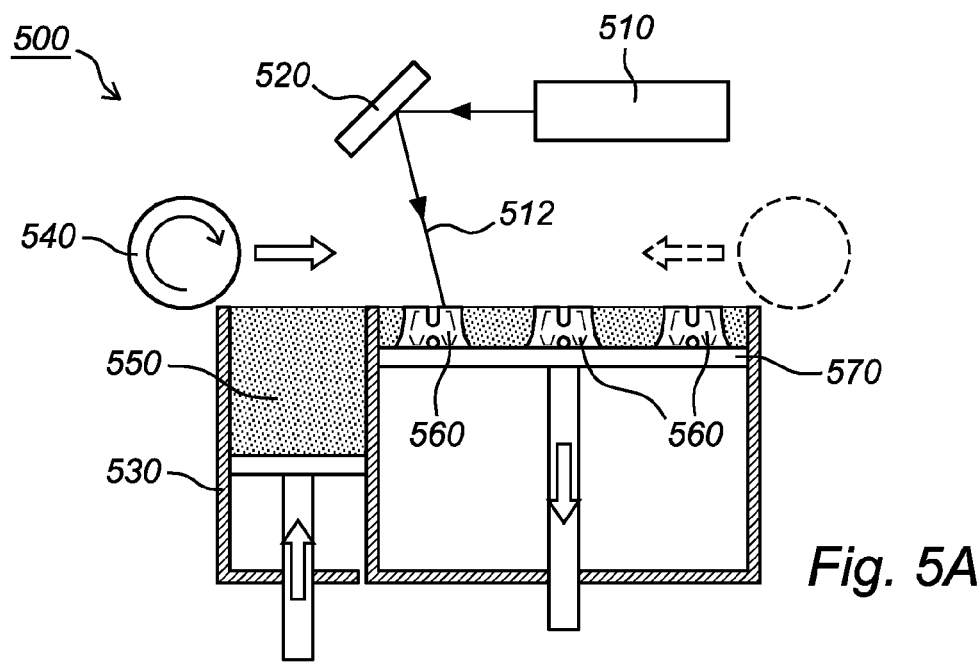
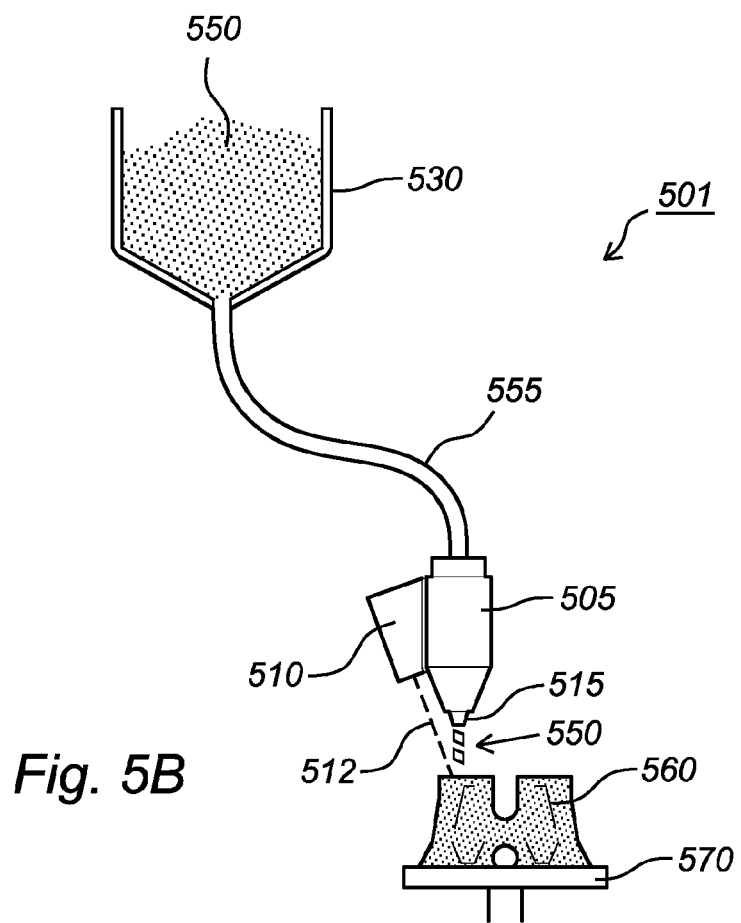
Fig. 5A
Fig. 5B

BUILDING BLOCK FOR A MECHANICAL CONSTRUCTION

CROSS-REFERENCE TO RELATED APPLICATIONS

This application is the U.S. national stage of International Application No. PCT/EP2014/078359 filed on Dec. 18, 2014, which claims priority to Great Britain patent application no. 1322419.1 filed on Dec. 18, 2013, the contents of which are both fully incorporated herein by reference.

FIELD OF THE INVENTION

The invention relates to a building block for a mechanical construction. The invention further relates to a bearing, to an actuator and to a gear box.

BACKGROUND ART

Additive manufacturing or more commonly called 3D printing is a known production technique in which a three-dimensional solid object is generated from a digital model. The process of additive manufacturing starts with generating the digital model via any known digital modeling methods, such as using a CAD program. Next, the digital model is divided into slices in which each slice indicates for this layer of the digital model where the printed material should be located. The individual slices are sequentially fed into an additive manufacturing tool or 3D printer which deposits the material according to the individual slices and as such generates the complete three-dimensional solid object layer by layer.

In the early days of additive manufacturing, mainly plastic materials or resins have been used as printed material for generating the three-dimensional solid object, but other processes have been developed in which also other materials, including different types of metal may be deposited in layers using this additive manufacturing technique. A major benefit of this manufacturing technique is that it allows the designer to produce virtually any three-dimensional object in a relatively simple production method. This may be especially beneficial when, for example, an initial model is required of a product or when only a limited number of products are required. A drawback of this manufacturing technique is the speed at which the three-dimensional solid objection is produced.

The use of additive manufacturing in high-quality bearings or actuators has been limited. However the possibilities it may provide seem unlimited.

SUMMARY OF THE INVENTION

One of the objects of the invention is to provide a strong building block for a mechanical construction.

The building block in accordance with the first aspect of the invention comprises a first printed material being printed via an additive manufacturing process, wherein the first printed material comprises a framework of a second material different from the first printed material and at least partially embedded in the first printed material.

The inventors have realized that the use of printed material in building blocks for mechanical constructions provide the opportunity to include a framework inside the printed material to strengthen an overall construction of the building block. The building block may, for example, be constituted partially of the first printed material which has a relatively low density and a relatively low strength and partially of the second material which has, for example, a relatively high strength. Such a building block may comprise an overall construction which has a relatively low overall weight while having a relatively high strength. Using such combination of features when generating at least a part of the building block from the first printed material allows to use the high flexibility of building block design which comes with the use of the first printed material, while the inclusion of the frame work allows for the building block to have the required strength.

High quality bearings, actuators, hubs, housings, connectors and gear boxes typically require high quality building blocks which may, for example, be able to withstand the wear and rolling contact fatigue which may be expected from such high building blocks. Especially, for example, in wind turbines, vehicles or aviation applications, the weight of these building blocks may be very significant while no concessions are acceptable related to the strength of that building block. Using a building block in which the first printed material is combined with a framework of the second material enables to construct the light weight building block having substantially any shape allows by the additive manufacturing process, while ensuring that the strength of such building block is according to the requirements.

The second material is different from the first printed material. This difference may be only a structural difference, such that, for example, the first printed material is iron, while the second material is hardened steel. Alternatively, the second material and the first printed material may be different substances. The first printed material may, for example, comprise a polymer or a ceramic, while the framework constituted of the second material may be a metal. Even further alternatively, the first printed material may be a first metal, while the second material is a second metal in which, for example, the first printed material is used to reduce any corrosion problems of the second material. The combination of the first printed material with the second material allows the use of optimized cellular lattice together with the surface texture definition and solid body construction to define the lightest and strongest structure and/or surfaces to bear a given set of mechanical, thermal and/or chemical loads. If another function is needed on top of the load bearing cellular lattice of the building block, this additional function may be printed simultaneously or separately.

The inventors have also realized that the framework of second material allows a localization of properties in a component made of a single material. By using the first printed material together with the framework of the second material a single building block may be created which locally, for example, has specific contact properties, and/or noise attenuation connection points, and/or structural robustness and/or light weight properties.

In an embodiment of the building block, building block comprises one or more hollow structures, the framework of the second material being included in some or all of the one or more hollow structures inside the first printed material. A benefit when using hollow structures inside the building block is that these additional hollow structures significantly reduce the overall weight of the building block. Furthermore, such hollow structures may be used to include additional elements of the building block, for example, sensors or lubricant storage, without the need to include additional space for these sensors or lubricant storage in the bearing, actuator or gear box.

Furthermore, the hollow structures significantly increase a surface to volume ratio, which may enhance chemical reactivity and/or the transfer of heat through the building block.

In an embodiment of the building block, the framework of the second material comprises a pre-fabricated framework embedded at least partially inside the first printed material. Such a pre-fabricated framework may be produced via any known method of production, such as injection molding or casting process. The pre-fabricated framework may also be used by a grinding process or via welding individual elements of the framework together. Using such pre-fabricated framework allows to use very strong materials as the second material in the framework which may be used to significantly enhance the overall strength of the building block. For example, using hardened steel as the pre-fabricated framework will ensure that the overall building block may be very strong, while limiting the weight of the building block by limiting the framework of hardened steel to locations where it is only required due to the strength requirements. The current invention allows both the construction of the overall building block and the integration of pre-fabricated components in a framework while still maintaining substantially all flexibility of the additive manufacturing process. Due to the first printed material a physically attaching of the different components to each other is prevented, thus avoiding additional manufacturing processes and unnecessary boundaries between the different components.

In an embodiment of the building block, the framework of the second material at least partially constitutes a wall of the one or more hollow structures. Using the wall of the hollow structures ensures that substantially the whole dimension of the hollow structure may be used, for example, to include sensors or other additional elements. Furthermore, using the walls of the hollow structures as at least part of the framework may result in a very strong structure. For example, using spheres as the framework, such spheres may often withstand significantly high pressure. Also other known structures may be chosen as the framework to ensure that the overall strength of such structure is high to withstand the forces that may act upon the building block. Including such spheres or structures of the second material encapsulated in the first printed material will result in an overall building block in which may be able to withstand higher pressure or tensile forces compared to building blocks without such included framework.

In an embodiment of the building block, the second material is second printed material different from the first printed material. The second printed material may, for example, be a metal, while the first printed material may be a polymer or ceramic. The second printed material may be relatively expensive and/or heavy while it may be necessary to use this second printed material to ensure the overall strength of the building block. The first printed material may be chosen to be relatively light material or may be chosen to be relatively cheap material which may be relatively easy to print.

In an embodiment of the building block, the framework constitutes a two-dimensional or three-dimensional skeleton for the building block at least partially embedded in the first printed material. Such a two-dimensional or three-dimensional skeleton may be a plurality of frameworks connected together to form the skeleton.

In an embodiment of the building block, the framework or the framework together with the first printed material is configured and constructed to bear a predefined load applied, in use, to a predefined area of an outer wall of the building block. Typically the overall strength of the building block is a combination of the framework and the first printed material.

In an embodiment of the building block, the predefined area of the outer wall of the building block comprises an oleophilic property. The predefined area may, for example, be an outer wall of a rolling element of a bearing, or may, for example, be a raceway surface of a bearing. Each of these surfaces may have to withstand a significant pressure while the rolling element is rolling along the raceway surface. The contact area between the rolling element and the raceway surface often contains a lubricant. By producing the predefined area of the outer wall as being oleophilic, the wetting property of this predefined area may be designed such that the lubricant will preferably be located at this contact area, in use.

In an embodiment of the building block, the oleophilic property of the predefined area of the outer wall is generated using a predefined surface structure at the predefined area, and/or using a third material applied to the predefined area. Applying such a third material, for example, being a third printed material, may be beneficial as such third material may be relatively easily applied via the additive manufacturing process. Alternatively, a surface structure may be applied for ensuring that the lubricant is maintained at the predefined area. The creation of specific surface roughness or surface textures may enhance wetting.

In an embodiment of the building block, the surface structure is generated using the first printed material or using the third material.

In an embodiment of the building block, the building block comprise a functionally graded interface layer at one of the interfaces between one of the materials in the building block and a further material in the building block, a composition of the functionally graded interface layer is configured to gradually change from the one material via a mixture of the one material and the further material to the further material. The composition of such functionally graded interface layer is configured to gradually change from one of the materials via a mixture of the one material and a further material to the further material. The one material may, for example, be the first printed material and the further material may, for example, be the second printed material. Alternatively, the first printed material may form a functionally graded interface layer with the third printed material, or the third printed material may form a functionally graded interface layer with the second printed material. A benefit of such functionally graded interface layer is that the bonding between the two materials is relatively strong.

In an embodiment of the building block, the first printed material and/or the second printed material is chosen from a list comprising metals, ceramics, polymers, elastomer. The first printed material and/or the second printed material may, for example, be a metal, for example, selected from a list comprising steel, stainless steel, maraging steel, tool steel, low alloy steel, copper alloys, nickel alloys, cobalt alloys, aluminum, aluminum alloys, titanium, titanium alloys.

The bearing in accordance with the second aspect of the invention comprises the building block according to any of the embodiments.

The actuator system in accordance with the third aspect of the invention comprises the building block according to any of the embodiments.

The gear box in accordance with the fourth aspect of the invention comprises the building block according to any of the embodiments.

Further aspects of the invention may also relate to mechanical components, such as hubs, housings, connectors and ribs for mechanical constructions. Such mechanical components according to the invention may have locally tuned multi-functions, such as local strength changes by including the framework of the second material, for example, second printed material.

BRIEF DESCRIPTION OF THE DRAWINGS

These and other aspects of the invention are apparent from and will be elucidated with reference to the embodiments described hereinafter. In the drawings, FIG. 10 shows a plan view of a cage for a bearing according to the invention, FIG. 5A shows a third embodiment of the additive manufacturing tool in which the material is granulated into small solid particles which are used for applying the printed material in the additive manufacturing process, FIG. 5B shows a fourth embodiment of the additive manufacturing tool in which the granulated solid material is dispensed from a dispenser for applying the printed material in the additive manufacturing process.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1A:
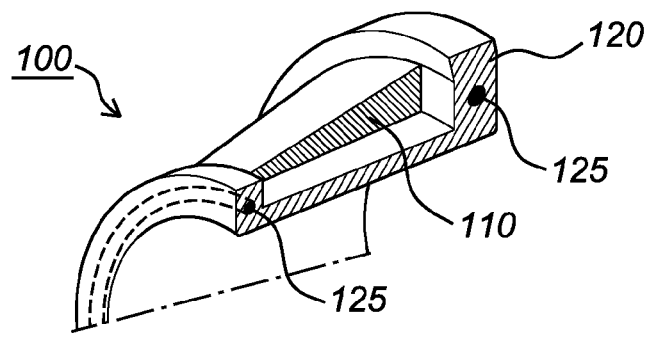
FIG. 1A shows a cross-sectional view of an inner ring for a bearing according to the invention.
Figure 2A:
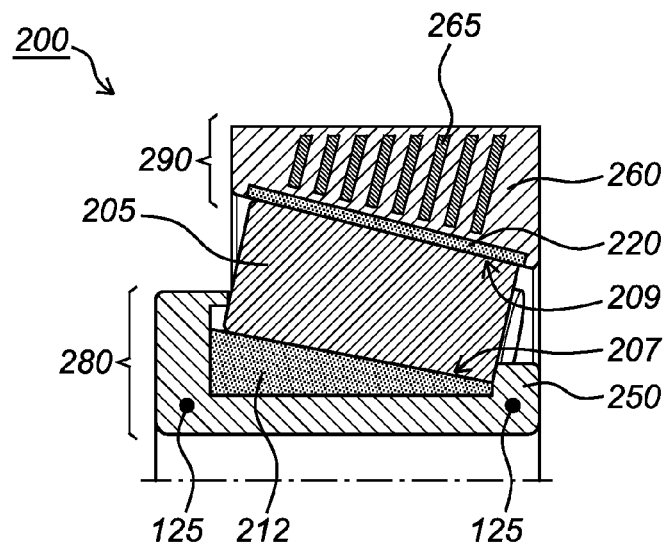
FIG. 2A shows a cross-sectional view of a bearing comprising first printed material and a framework of a second material according to the invention.

FIG. 1A shows a cross-sectional view of an inner ring 100 for a bearing 200, for example, for the bearing 200 shown in FIG. 2A. The inner ring 100 being a building block 100 according to the invention and comprises a raceway ring 110 having a raceway surface, and comprises first printed material 120 printed onto the raceway ring 110. The use of the first printed material 120 provides a very flexible way of producing the outer shape of the inner ring 100 for a bearing 200 in which the first printed material 120 may have any shape required. Using a substantially standardized raceway ring 110 as a starting product, the production of a customized inner ring 100 may be relatively easy by adding the first printed material 120. Using such additive material process for adding printed material to a substantially standardized raceway ring 110 ensures both high flexibility and high quality of the customized inner ring 100. Also shown in the inner ring of FIG. 1A is that the first printed material 120 comprises a framework 125 in the form of a ring 125 embedded inside the first printed material 120. Such a framework 125 is constituted of a second material 125 different from the first printed material 120. This second material 125 may, for example, be produced during the additive manufacturing process in which, for example, the second printed material 125 is deposited in a similar or different additive manufacturing process compared to the first printed material 120. Alternatively, the second material 125 may be a pre-fabricated second material 125 such as a pre-fabricated ring 125, for example, constituted of hardened steel 125. As such, the use of the first printed material 120 together with the framework of the second material 125 according to the invention enables a combination of a pre-fabricated element of the second material 125 together with the first printed material 120. This pre-fabricated element of the second material 125 may be structurally different from the first printed material 120, comparable to the difference between iron and hardened steel, or may be chemically different, comparable to the difference between iron and messing.

Figure 1B:
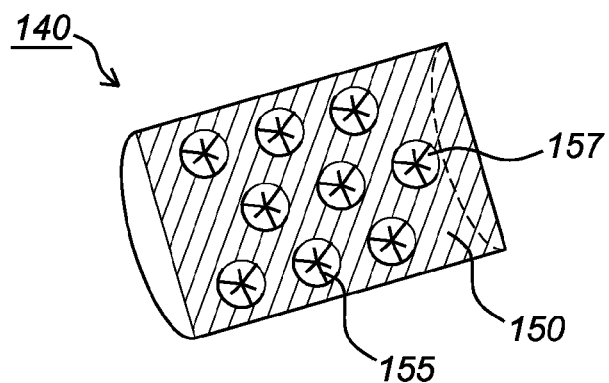
FIG. 1B shows a cross-sectional view of a rolling element for a bearing according to the invention.

When the framework of the second material 125 is a framework of second printed material 125, the deposition of the second printed material 125 on the first printed material 120 may generate a functionally graded interface layer (not shown). The composition of such functionally graded interface layer is configured to gradually change from the first printed material 120 via a mixture of the first printed material 120 and the second printed material 125 to the second printed material 125. A benefit of such functionally graded interface layer is that the bonding between the first printed material 120 and the second printed material 125 is relatively strong FIG. 1B shows a cross-sectional view of a rolling element 140 for a bearing 200 according to the invention. The rolling element 140 being the building block 140 according to the invention and comprises the first printed material 150 together with a framework of second material 155. In the embodiment shown in FIG. 1B, the framework of second material 155 is arranged inside a hollow structure 157 inside the first printed material 150. Alternatively, at least a part of the framework of the second material 155 may constituted at least a part of the inner wall of the hollow structure 157. As such, the framework of the second material 155 may contribute to the overall strength of the hollow structure 157 which may result in a significant overall weight loss due to the inclusion of hollow structures 157 into the first printed material 157 while ensuring that the overall strength of the building block 140 remains similar or even stronger than without the hollow structures 157.

In the embodiment shown in FIG. 1B the rolling element 140 is constituted of first printed material 150. However, the rolling element 140 may also only partially comprise first printed material 150 (not shown), for example, the rolling element 140 may comprise an outer casing (not shown) of, for example, prefabricated hardened steel in which an inner part of the rolling element 140 comprises the first printed material 150 comprising the framework of the second material 155. A benefit of using the outer casing of hardened steel is that this will ensure that the rolling element 140 may be able to withstand the long wear imposed on the rolling element 140 during use in the bearing 200.

Figure 1C:
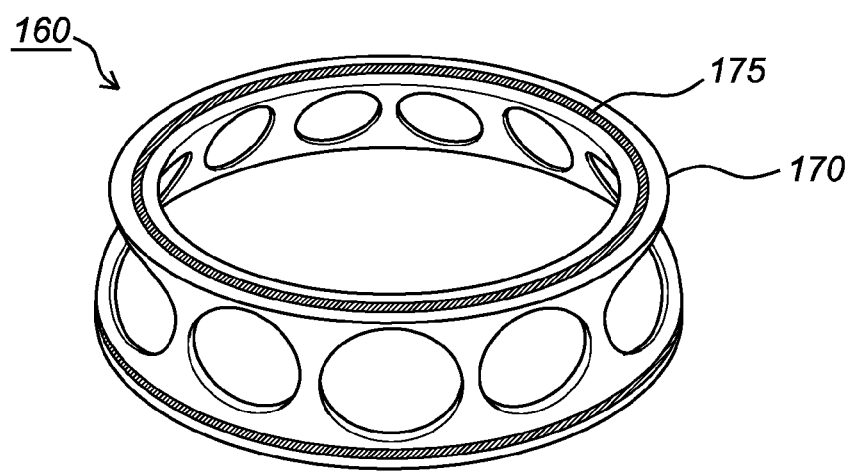

FIG. 1C shows a plan view of a cage 160 for a bearing 200 according to the invention. The cage 160 being the building block 160 according to the invention may also comprise the first printed material 170 together with the framework of second material 175 at least partially embedded inside the first printed material 170. In this embodiment, the framework of the second material 175 again is a ring-shaped framework of the second material 175 which may be used to strengthen the overall building block 160. This ring-shaped framework of the second material 175 may comprises of second printed material 175 printed together with the first printed material 170 or printed separately from the first printed material 170. When the second printed material 175 is printed together with the first printed material 170, a functionally graded interface layer (not shown) as previously indicated may again be generated between the first printed material 170 and the second printed material 175. Alternatively, the framework of the second material 175 may be a pre-fabricated framework of the second material 175, for example, constituted of hardened steel such as to increase the overall strength of the cage 160 while maintaining the flexibility of the additive manufacturing process by using the first printed material 170.

FIG. 2A shows a cross-sectional view of a bearing 200 comprising the first printed material 250, 260 and comprising the framework of second material 265 at least partially embedded inside the first printed material 260. The bearing 200 comprises rolling elements 205. These rolling elements 205 may be similar to the rolling element 140 being a building block 140 according to the invention as shown in FIG. 1B. The bearing 200 comprises an inner ring 280 which may be similar to the inner ring 100 being the building block 100 according to the invention. Also in this embodiment of the inner ring 280, the inner ring 280 is constituted of a raceway ring 212 at which the first printed material 250 is applied. Inside the first printed material 250 the framework of second material 125 is located, for example, being a pre-fabricated ring-shaped framework of second material 125. The bearing 200 also comprises an outer ring 290 comprising the raceway ring 220 at which the first printed material 260 is applied, similar as the inner ring 280. Now, the framework of second material 265 is constituted by a plurality of frameworks 265 extending in radial direction to withstand radial forces which may apply to the outer ring 280. The second material 125, 265 may be second printed material 125, 265 or may be pre-fabricated as indicated in the embodiments herein above.

Figure 2B:
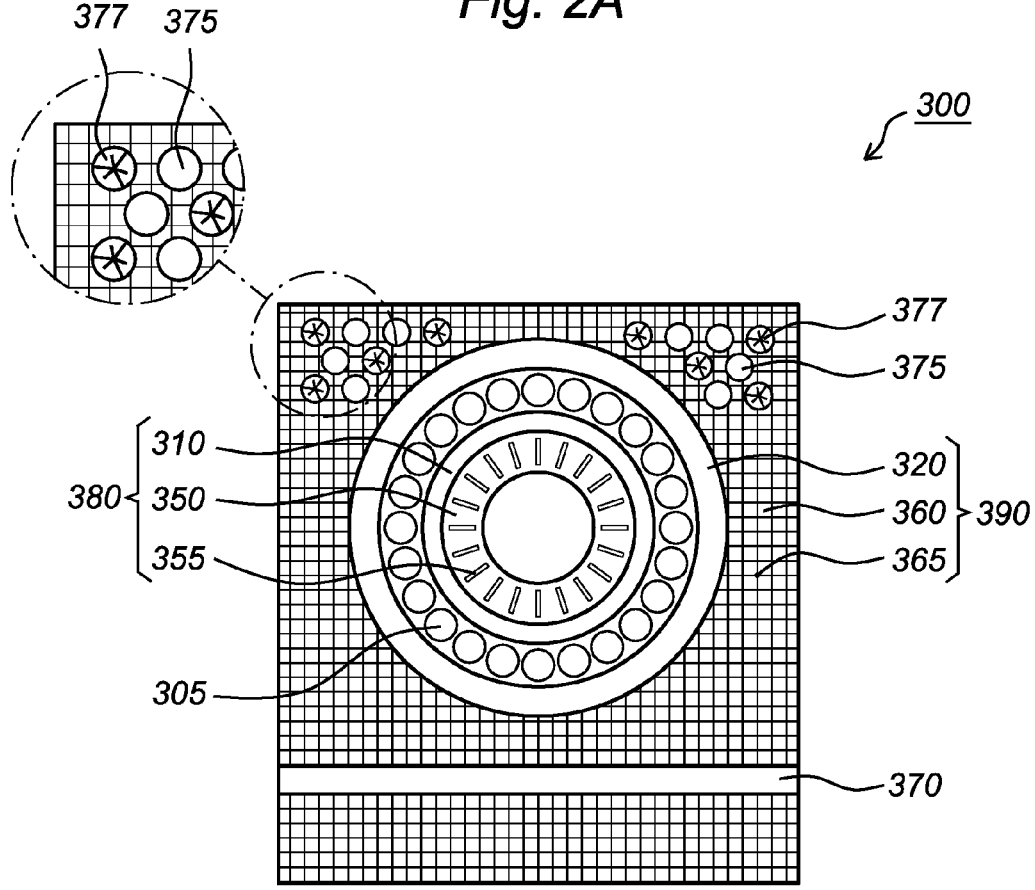
FIG. 2B shows a cross-sectional view of a further bearing comprising the first printed material and a framework of the second material according to the invention.

FIG. 2B shows a cross-sectional view of a further bearing 300 comprising printed material 350, 360. The bearing 300 shown in FIG. 2B is a ball-bearing 300 comprising rolling elements 305 being spheres 305. Also these spheres 305 may be building blocks 305 according to the invention in which the spheres 305 are constituted at least partially of first printed material (not shown) and a framework of second material (not shown) at least partially embedded inside the first printed material. The inner ring 380 comprises the raceway ring 310 having printed material 350 bonded to the raceway ring 310. A plurality of frameworks of second material 355 are embedded in the first printed material 350 to enhance a strength of the overall inner ring 380 for the bearing 300. The outer ring 390 comprises the raceway ring 320 having printed material 360 bonded to the raceway ring 320. As can be seen from FIG. 2B, the outer dimensions of the printed material 360 attached to the raceway ring 320 of the outer ring 390 may have any shape, for example, having the rectangular cross-sectional dimension as shown in FIG. 2B. In such a configuration as shown in FIG. 2B, the printed material 360 of the outer ring 390 may further comprise a bore 365, for example, for allowing screws or other attachment means to connect the outer ring 390 to a structural element (not shown). In the embodiment shown in FIG. 2B the printed material 360 of the outer ring 390 further comprises hollow structures 375 which may be used to reduce the overall weight of the bearing 300. Some or all of these hollow structures 375 comprise a framework of second material 377 for strengthening the hollow structures 375 or for strengthening the first printed material 360. This framework of second material 377 may be a pre-fabricated framework of the second material 377 or may be a framework constituted of the second printed material 377 as indicated herein above. In FIG. 2B the remainder of the first printed material 360 comprises a three-dimensional skeleton 365 substantially following the complete shape of the first printed material 360. Such skeleton 365 may be used as a complete lattice of hollow structures (not shown) to shape the outer dimensions of the outer ring 390 and for defining outer surfaces of the outer ring 390 while allowing the inner structure of the outer ring 390 to have as many hollow structures (not shown) as possible to minimize the overall weight of the outer ring 390.

Figure 3A:
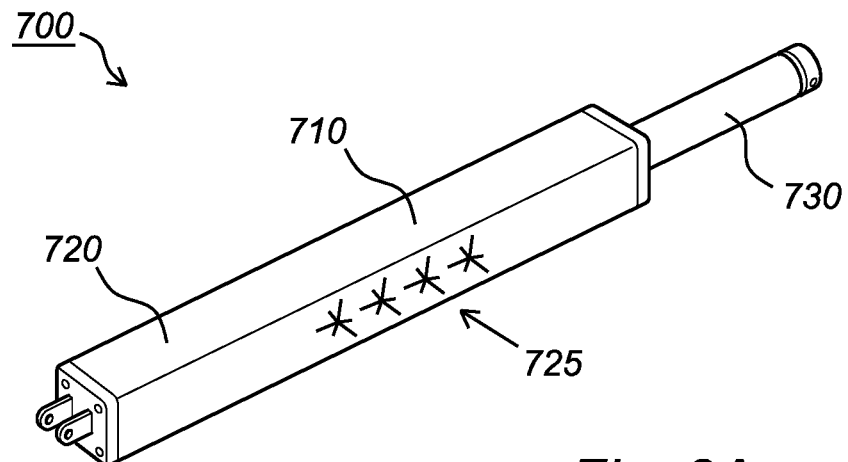
FIG. 3A shows a plan view of an actuator system comprising the first printed material and the framework of the second material.

FIG. 3A shows a plan view of an actuator system 700 comprising a housing 710, body 710 or static element 710 of the actuator system 700 and traveling element 730 or shaft 730 or rod 730 of the actuator system 700. The housing 710 is at least partially constituted of the first printed material 720 comprising the framework of second material 725 according to the invention. Any of the combinations of the first printed material 720 and the framework of the second printed material 725 as indicated in the previous examples, may be applied here too to generate the overall strength of the building block as required and/or the reduction of weight as required.

Figure 3B:
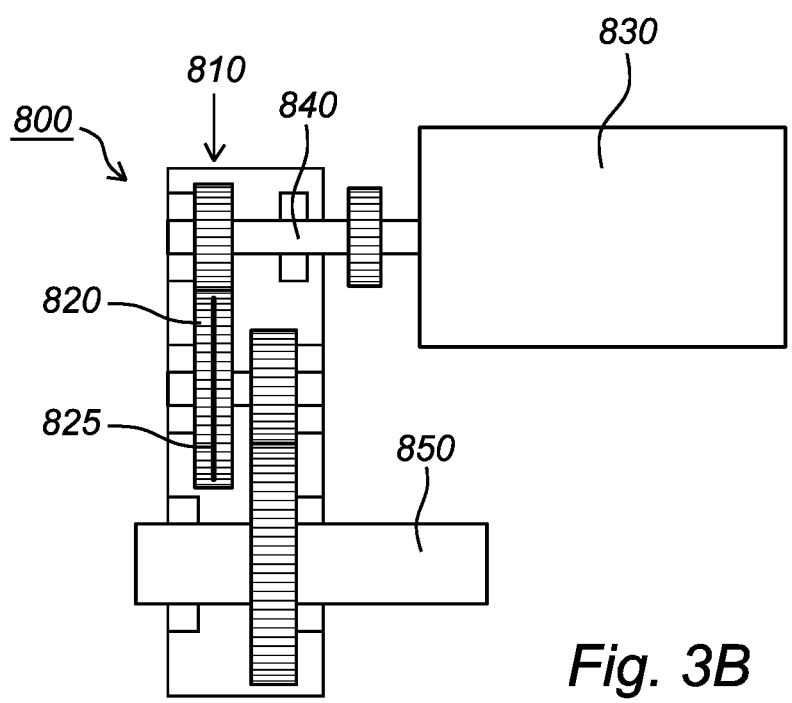
FIG. 3B shows a gear box comprising the first printed material and the framework of the second material according to the invention.

FIG. 3B shows a cut-open plan-view of a gear box 800 according to the invention. The gear box 800 is connected to a motor 830 via a first shaft 840 and the gear box 800 transfers the rotation speed of the motor 830 to a converted rotation speed of the second shaft 850. The gear box 800 comprises a plurality of gear wheels 810. One of the gear wheels 810 is at least partially constituted of the first printed material 820 and comprises the framework of second material 825 as a reinforcement framework inside the first printed material 820. Again, any of the combinations of the first printed material 820 and the framework of the second printed material 825 as indicated in the previous examples, may be applied here too to generate the overall strength of the building block as required and/or the reduction of weight as required.

As indicated before, further aspects of the invention may also relate to mechanical components, such as hubs (not shown), housings (not shown), connectors (not shown) and ribs (not shown) for mechanical constructions. Such mechanical components according to the invention may have locally tuned multi-functions, such as local strength changes by including the framework of the second material, for example, second printed material.

Figure 4A:
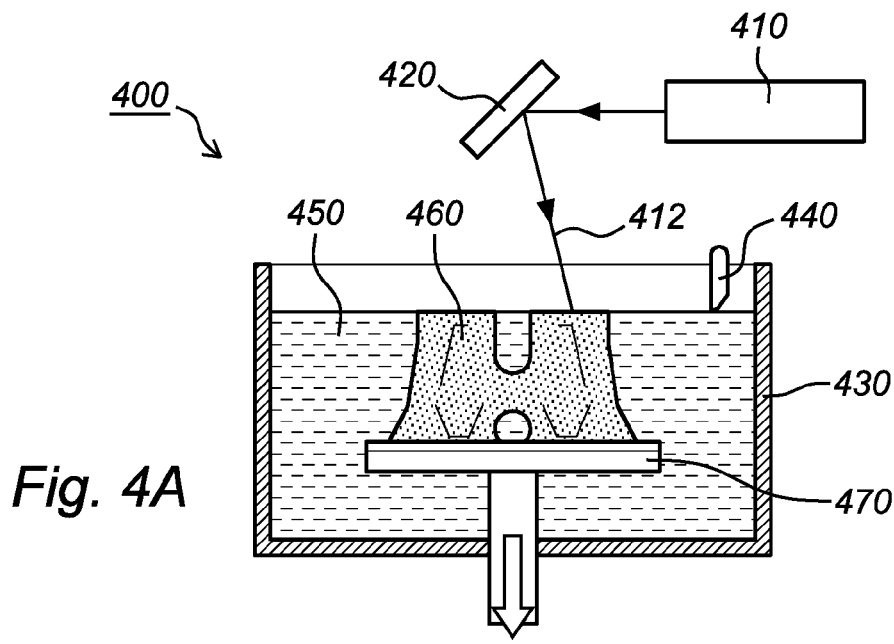
FIG. 4A shows a first embodiment of an additive manufacturing tool in which a liquid resin is used for applying the printed material in the additive manufacturing process.

FIG. 4A shows a first embodiment of an additive manufacturing tool 400 in which a liquid resin 450 is used for applying the printed material 460 in the additive manufacturing process. Such additive manufacturing tool 400 comprises resin container 430 comprising the liquid resin 450. Inside the resin container 430 a platform 470 is positioned which is configured to slowly move down into the resin container 430. The additive manufacturing tool 400 further comprises a laser 410 which emits a laser beam 412 having a wavelength for curing the liquid resin 450 at the locations on the printed material 460 where additional printed material 460 should be added. A re-coating bar 440 is drawn over the printed material 460 before a new layer of printed material 460 is to be applied to ensure that a thin layer of liquid resin 450 is on top of the printed material 460. Emitting using the laser 410 those parts of the thin layer of liquid resin 450 where the additional printed material 460 should be applied will locally cure the resin 450. In the embodiment as shown in FIG. 4A the laser beam 412 is reflected across the layer of liquid resin 450 using a scanning mirror 420. When in the current layer all parts that need to be cured, have been illuminated with the laser beam 412, the platform 470 lowers the printed material 460 further into the liquid resin 450 to allow the re-coating bar 460 to apply another layer of liquid resin 450 on top of the printed material 460 to continue the additive manufacturing process.

Figure 4B:
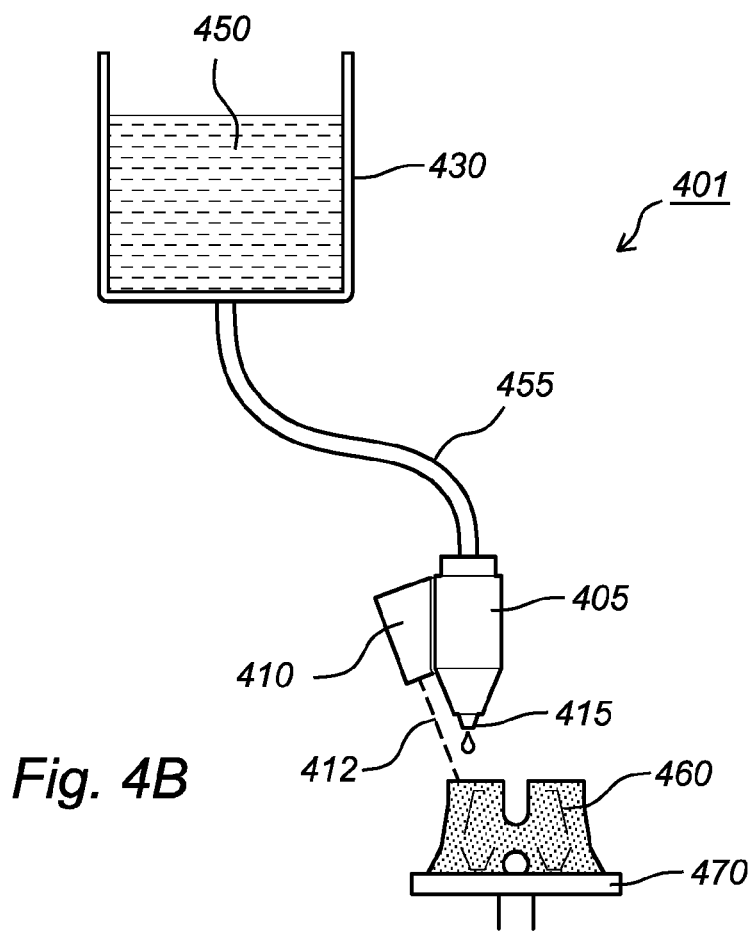
FIG. 4B shows a second embodiment of the additive manufacturing tool in which a liquid resin is dispensed from a dispenser for applying the printed material in the additive manufacturing process.

FIG. 4B shows a second embodiment of the additive manufacturing tool 401 in which a liquid resin 450 is dispensed from a dispenser 405 or print head 405 for applying the printed material 460 in the additive manufacturing process. The additive manufacturing tool 401 again comprises the resin container 430 comprising the liquid resin 450 which is fed via a feed 455 towards the print head 405. The print head 405 further comprises a print nozzle 415 from which droplets of liquid resin 450 are emitted towards the printed material 460. These droplets may fall under gravity from the print head 405 to the printed material 460 or may be ejected from the print nozzle 415 using some ejection mechanism (not shown) towards the printed material 460. The print head 405 further comprises a laser 410 emitting a laser beam 412 for immediately cure the droplet of liquid resin 450 when it hits the printed material 460 to fix the droplet of liquid resin 450 to the already printed material 460. The printed material 460 forming a solid object may be located on a platform 470.

FIG. 5A shows a third embodiment of the additive manufacturing tool 500 in which the material is granulated into small solid particles 550 which are used for applying the printed material 560 in the additive manufacturing process. Now, the additive manufacturing tool 500, also known as a Selective Laser Sintering tool 500, or SLS tool 500 comprises a granulate container 530 comprising the granulated small solid particles 550. The printed material 560 is located again on a platform 570 and is completely surrounded by the granulated small solid particles 550. Lowering the platform allows a granulate feed roller 540 to apply another layer of granulated solid particles 550 on the printed material 560. Subsequently locally applying the laser beam 512 using the laser 510 and the scanning mirror 520 will locally melt the granulated solid particles 550 and connects them with each other and with the printed material 560 to generate the next layer of the solid object to be created. Next, the platform 570 moves down further to allow a next layer of granulated solid particles 550 to be applied via the granulate feed roller 540 to continue the next layer in the additive manufacturing process.

FIG. 5B shows a fourth embodiment of the additive manufacturing tool 501 or SLS tool 501 in which the granulated solid material 550 is dispensed from a dispenser 505 or print head 505 for applying the printed material 560 in the additive manufacturing process. The additive manufacturing tool 501 again comprises the granulate container 530 comprising the granulated solid particles 550 which are fed via a feed 555 towards the print head 505. The print head 505 further comprises a print nozzle 515 from which granulated solid particles 550 are emitted towards the printed material 560. These solid particles 550 may fall under gravity from the print head 505 to the printed material 560 or may be ejected from the print nozzle 515 using some ejection mechanism (not shown) towards the printed material 560. The print head 505 further comprises a laser 510 emitting a laser beam 512 for immediately melting or sintering the solid particle 550 when it hits the printed material 560 to fix the solid particle 550 to the already printed material 560. The printed material 560 forming a solid object may be located on a platform 570.

Figure 6:
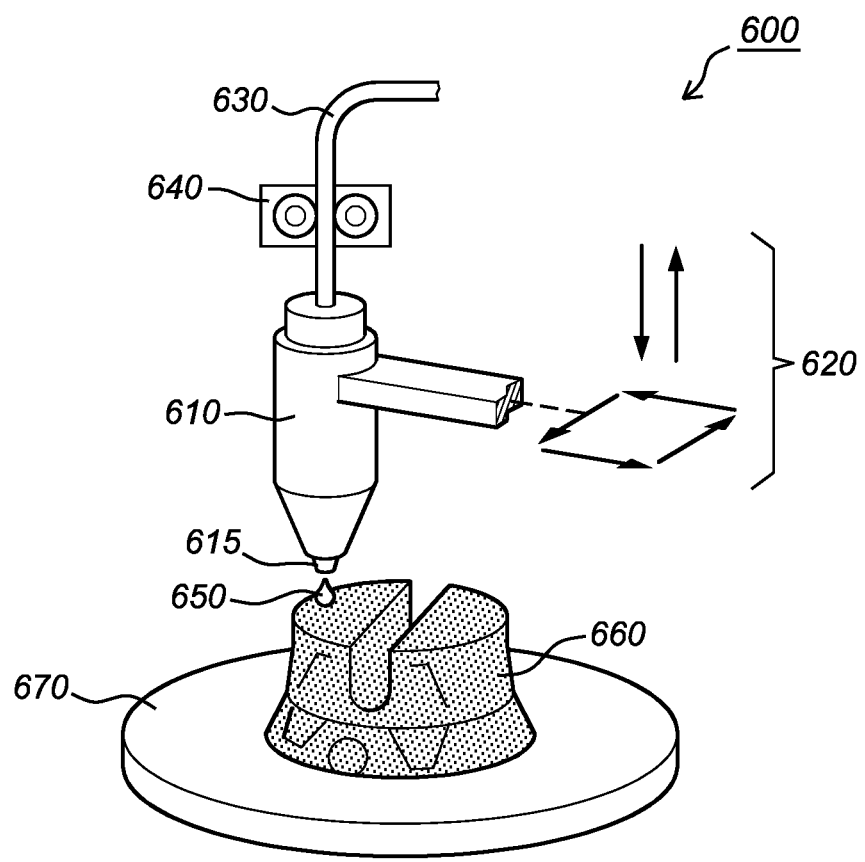
FIG. 6 shows a fifth embodiment of the additive manufacturing tool in which melted plastic material is dispensed for applying the printed material in the additive manufacturing process.

FIG. 6 shows a fifth embodiment of the additive manufacturing tool 600 in which a melted plastic material 650 is dispensed for applying the printed material 660 in the additive manufacturing process. The additive manufacturing tool 600 shown in FIG. 6 is also known as Fused Deposition Modeling tool 600 or FDM tool 600. Now a plastic filament 630 is fed into a dispenser 610 or melter 610 via a filament feeder 640. The dispenser 610 or melter 610 comprises an extrusion nozzle 615 for melting the plastic filament 630 to form a droplet of melted plastic material 650 which is applied to the printed material 660 where it hardens and connects to the already printed material 660. The dispenser 610 may be configured and constructed to apply the droplet of melted plastic 650 to the printed material 660 under gravity or via an ejection mechanism (not shown). The additive manufacturing tool 600 further comprises a positioning system 620 for positioning the dispenser 610 across the printed material 660.

Summarizing, the invention provides a building block 140 for a mechanical construction. The invention further provides a bearing, an actuator system, a housing, a hub, a mechanical connector and a gear box. The building block comprises a first printed material 150 being printed via an additive manufacturing process, wherein the first printed material comprises a framework of a second material 155 different from the first printed material and at least partially embedded in the first printed material. This framework of the second material may be included in a hollow structure 157. Alternatively, at least a part of the framework of the second material may constitute at least a part of the inner wall of the hollow structure. The framework of the second material may be pre-fabricated or may also be generated via the additive manufacturing process. A benefit of this building block is that it allows an increase of strength while limiting the overall weight.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

| LISTING OF REFERENCE NUMBERS | | | |
|---|---|---|---|
| Building block | 100, 140, 160, 205, 280, 290, 305, 380, 390 | Additive manufacturing tool | 400, 401 |
| | | Print head | 405, 505 |
| | | Print nozzle | 415, 515 |
| Raceway ring | 110, 210, 220, 310, 320 | Laser | 410, 510 |
| | | Laser beam | 412, 512 |
| Bearing | 200, 300 | Scanning mirror | 420, 520 |
| Roller elements | 140, 205, 305 | Resin container | 430 |
| First printed material | 120, 150, 170, 250, 350, 360, 460, 560, 660 | Re-coating bar | 440 |
| | | Liquid resin | 450 |
| | | Feed | 455, 555 |
| Second material | 125, 155, 175, 265, 365, 377 | Platform | 470, 570, 670 |
| | | SLS-tool | 500, 501 |
| Steel element | 125, 175, 355 | Granulate container | 530 |
| Second printed material | 265, 365, 377 | Granulate feed roller | 540 |
| Printed material | 120, 150, 170, 250, 350, 360, 460, 560, 660, 720 | Granulate material | 550 |
| | | FDM-tool | 600 |
| | | Melter | 610 |
| | | Extrusion nozzle | 615 |
| Printable material | 450, 550, 650 | Positioning construction | 620 |
| Cage | 160 | Filament | 630 |
| Inner ring | 100, 280, 380 | Filament feeder | 640 |
| Outer ring | 290, 390 | Liquid plastic | 650 |
| Cavity | 157, 257, 375 | | |
| Construction hole | 365 | | |

The invention claimed is:

1. A building block for a mechanical construction, the building block comprising:
   a first ring comprising a first raceway ring embedded in a first ring support formed by a first ring first material, the first ring first material is formed into the first ring support via an additive process to print the first ring first material over the first raceway ring such that the first raceway ring is configured to contact a rolling element,
   a first framework comprising at least one annular disk formed of a first ring second material is completely enclosed by the first ring support, the first ring second material being separate and different from the first ring first material such that the first framework forms a reinforcement, wherein each of the at least one annular disk defines a flat surface that extends along a direction parallel to a radius of the at least one annular disk and that extends orthogonally with respect to the first raceway ring,
   a second raceway ring,
   a second ring comprising a second raceway ring embedded in a second ring support formed of a second ring first material, the second ring first material is formed into the second ring support via an additive process to print the second ring first material over the second raceway ring such that the second raceway ring is embedded within the second ring first material and configured to contact the rolling element,
   a second framework, separate from the first framework, comprising at least one ring formed of a second ring second material is completely enclosed by the second ring first material, the second framework having a different configuration from the first framework, the second ring second material being separate and different from the second ring first material which forms another reinforcement, and
   the roller element positioned between the first ring and the second ring.

2. The building block of claim 1, wherein the first framework comprising a pre-fabricated framework.

3. The building block of claim 1, wherein the second framework of the second material is a pre-fabricated framework.

4. The building block of claim 1, wherein the first framework further comprises an interface layer located between the first ring first material and the first framework.

5. The building block of claim 1, wherein the first framework constitutes at least one of a two-dimensional and three-dimensional skeleton for the building block.

6. The building block of claim 1, wherein at least one of first ring and the second ring is configured and constructed to bear a predefined load applied to a predefined area of an outer wall of the first ring.

7. The building block of claim 6, wherein the predefined area of the outer wall of the first ring comprises an oleophilic property.

8. The building block of claim 7, wherein the oleophilic property of the predefined area of the outer wall is generated using a predefined surface structure at the predefined area, and/or using a third material applied to the predefined area.

9. The building block of claim 8, wherein the surface structure is generated using the third material.

10. The building block of claim 1, wherein a functionally graded interface layer is positioned at one of the interfaces between the first ring first material and the first ring second material in the first ring, a composition of the functionally graded interface layer gradually changes from the first material via a mixture of the first material and the second material to the second material.

11. The building block of claim 1, wherein the first ring first material is one of the group consisting of a metal, a ceramic, a polymer, an elastomer, and a crystalline material.

12. The building block of claim 1, the rolling element having a body formed of a third material, the body having a plurality of hollows completely enclosed therein, the plurality of hollows each filled by a third framework formed by a fourth material.

13. The building block of claim 12, wherein the rolling element further includes an outer casing over the body formed by the first ring first material.

14. The building block of claim 13, wherein rolling element further includes the outer casing being formed of hardened steel.

* * * * *